Patented May 6, 1947

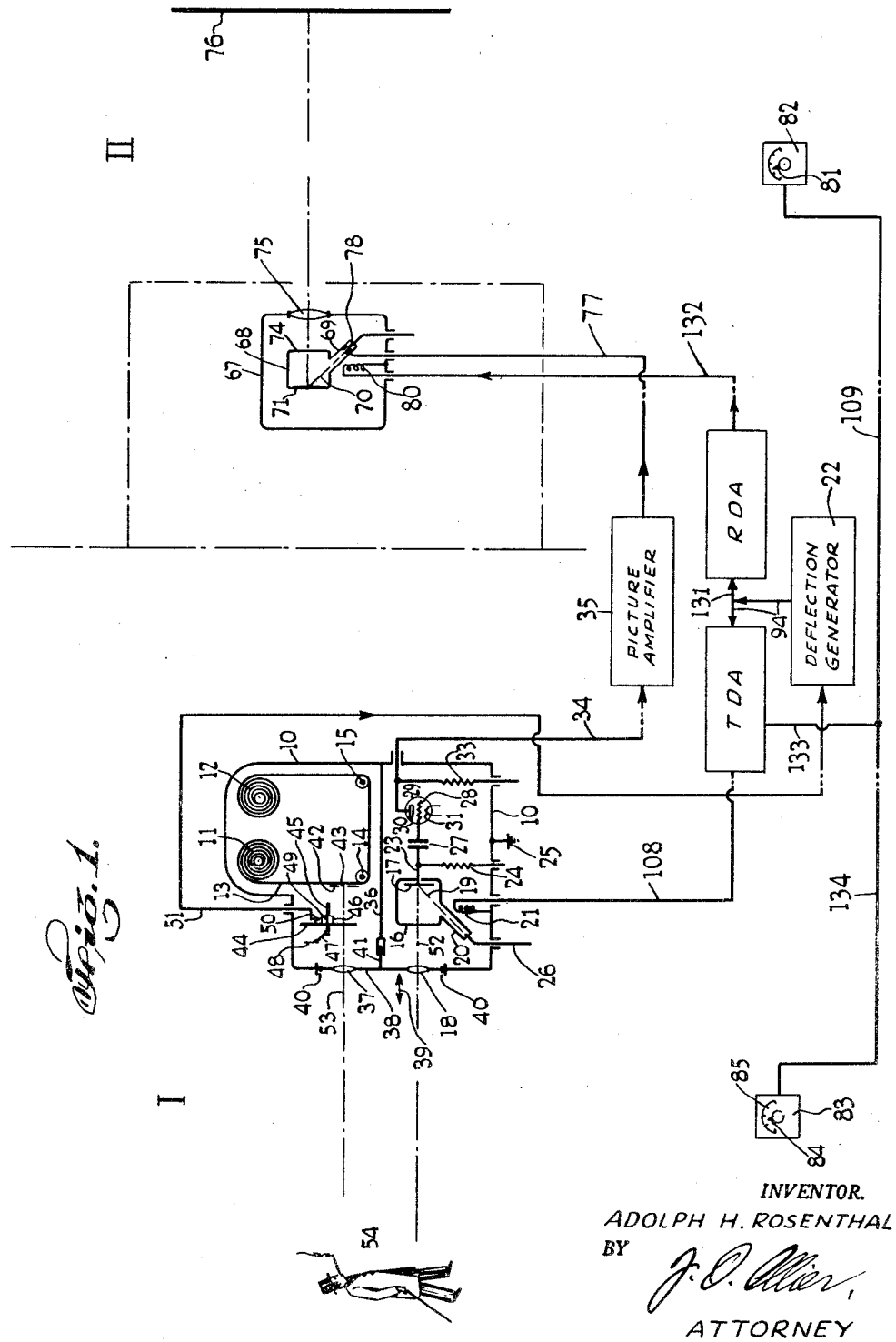

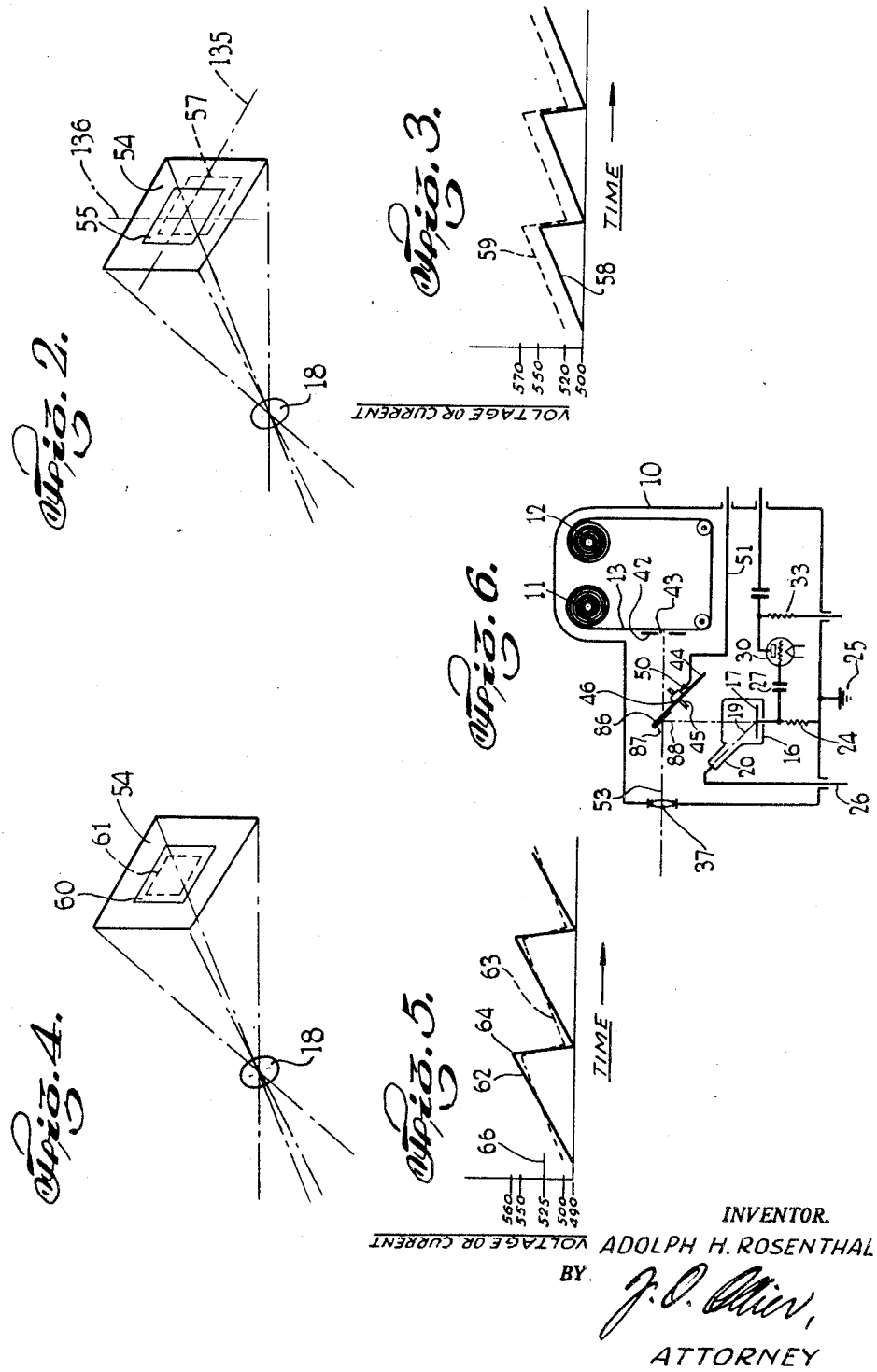

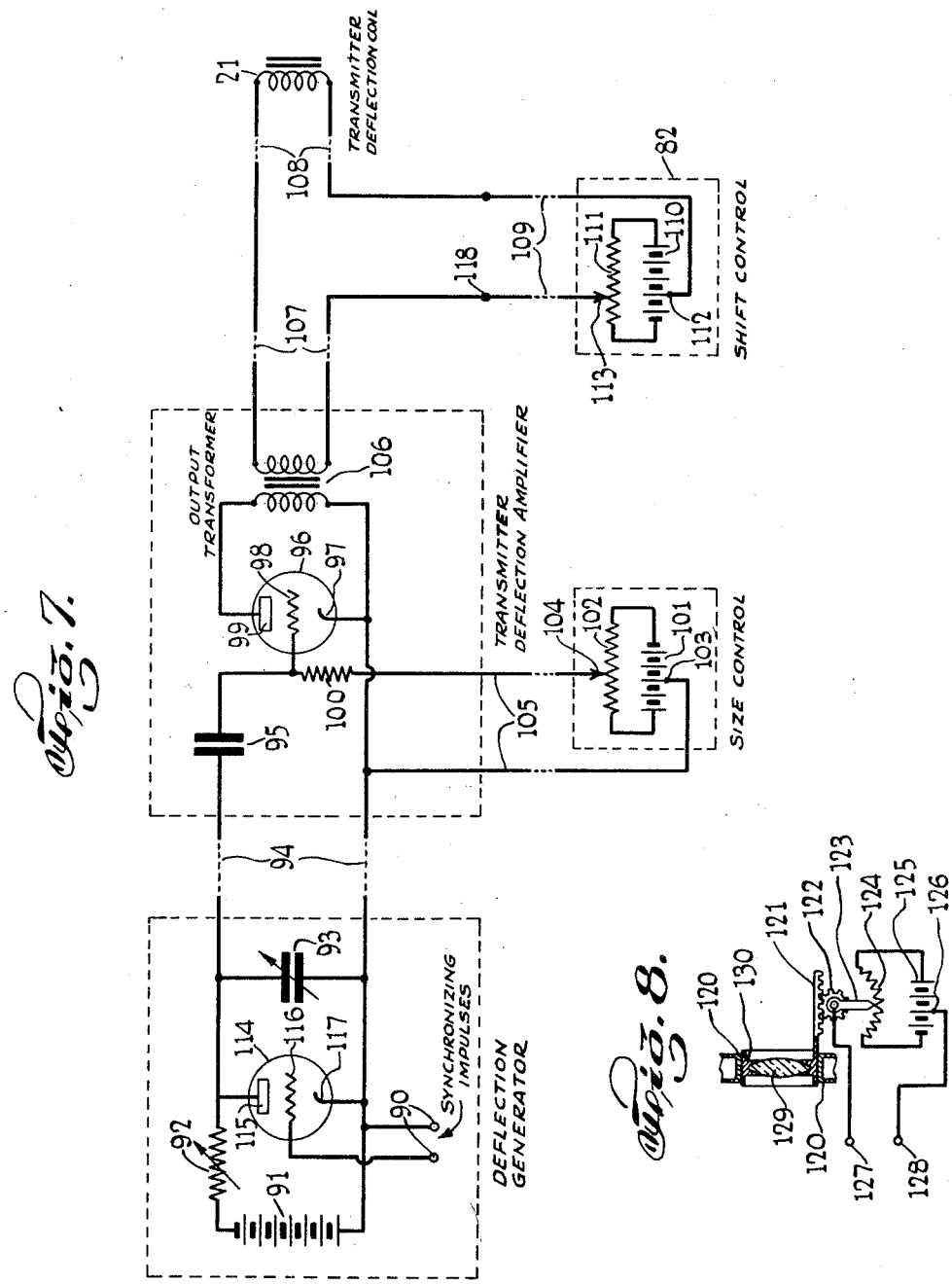

2,420,197

UNITED STATES PATENT OFFICE 2,420,197

SYSTEM FOR SUPERVISING THE TAKING OF MOVING PICTURES

Adolph H. Rosenthal, New York, N. Y.

Application June 16, 1944, Serial No. 540,558

11 Claims. (Cl. 178—6.8)

This invention relates to a method of and a system for controlling and supervising from a distant place, the taking of moving pictures.

In taking moving pictures in studios or open air of scenes or features or of actual events, it happens that the pictures taken do not come up to expectation and give on the moving picture screen a totally different impression from the scene as viewed during the taking process, in that, for instance, prominent actors in a play are covered by other actors or scenery or unfavorably lighted, or that in a picture of an actual event important parts are in the background, badly lighted or hardly visible. While it is possible to retake scenes of a play or feature, it is of course impossible to retake singular events; retaking of the picture is costly as to film used up and time of personnel, space and equipment expended.

It has therefore been suggested to combine a television transmission camera with the moving picture camera and to transmit by the former the picture as it is simultaneously taken by the moving picture camera, to a distant place where the latter is reproduced on a screen and conveys substantially the same impression to the observing director as the projected film finally will on the theatre screen.

It is an object of the invention to avoid or minimize retakes of pictures of an acted scene and to assure proper taking of actual happenings. It is, however, a new and further object of the invention to enable a supervisor at the distant place, who may be the director or producer of a moving picture or the picture editor of a newspaper or magazine, to explore a scene which is before the camera and make a selection of a portion thereof, and to cause the taking of the selected portion from that distant place.

It is another object of the invention to enable the supervisor at the distant place to reproduce on his observation screen and on different scales, either the entire scene before the camera or selected portions thereof, the latter either enlarged as a blow-up or reduced, so that he can from his observation stand cause the moving picture camera to be properly focused and brought closer to or farther away from the scene or object; with the camera closer to the scene, or with increased focal length of its lens, a selected smaller portion of it will be taken at a larger scale, and with the camera farther away from the scene, or with reduced focal length of the camera lens, a selected larger and more comprehesive section of it will be taken at a smaller scale.

It is still another object of the invention to enable the supervisor at the distant place to reproduce on his observation screen the scene or objects before the camera as they will finally appear on the theatre screen and to select both the portion of the scene to be taken as well as the scale at which it is to be taken.

It is still a further object of the invention to provide the television transmission or pick-up camera with a considerably larger field or range of view than the moving picture camera, and to enable the supervisor to reproduce arbitrarily on his observation screen by purely electric means and without further mechanically adjusting the pick-up camera, on desired variable scale any portion of the scene within the field or range of view of the pick-up camera, so that he can explore the scene and select its portion to be taken, and also can establish the proper distance and focus of the moving picture camera from the selected portions.

It is still another object of the invention to enable the supervisor to check on lighting effects, settings and acting so as to avoid costly misjudgments, without consuming film and disturbance of the actors, and to arrange for the selected taking of the picture either by acoustical and/or optical signals transmitted to the place of taking the picture, or by remote control of the moving picture camera.

These and other objects of the invention will be more clearly understood as the specification proceeds with reference to the drawings in which Fig. 1 shows in vertical cross-section and diagrammatically a moving picture camera combined with a television transmission or pick-up apparatus for taking a moving picture at one place, a television reception or reproducing apparatus at a distant place, and their interconnection, Figs. 2 and 4 perspectively and diagrammatically the exploration of the scene within the field of view of the pick-up apparatus and the selection therefrom of different sections of equal size (Fig. 2) or different size (Fig. 4), Figs. 3 and 5 sawtooth diagrams illustrating a manner in which such selections can be effected electrically, Fig. 6 a modified combination of a moving picture camera with a television transmission or pick-up apparatus, Fig. 7 a circuit diagram illustrating a manner in which such selections can be effected electrically, and Fig. 8 a method for compensating parallax electrically.

Referring to Fig. 1, it is assumed that a moving picture is taken in place I, in open air or in a studio, of an acted scene or an actual event. Another and in particular distant place II is the observation stand where the scene or event is simultaneously reproduced by television transmission.

The moving picture camera and the television transmission and reproducing apparatuses used in places I and II are shown with all known details unessential for the invention omitted.

The moving picture camera is arranged in the upper compartment of casing 10 and comprises essentially a lens system 37 (indicated by a single lens), shutter 44, film gate 42, and reels 11, 12 for a film 13 running over guiding rollers 14, 15; conventional mechanisms for step-wise transporting the film and for rotating the shutter are omitted.

A television transmission or pick-up apparatus is arranged in the lower compartment of casing 10 and comprises essentially a cathode ray pick-up tube 16 including a signal plate the photo-electric or light-sensitive surface 54 of which is exposed toward a lens system 18 (indicated by a single lens). A cathode ray beam or pencil 19 produced by a cathode ray gun (not shown) in and near the bottom of neck 20 of tube 16 is swept over for instance by magnetic deflection through coil 21 and impinges upon the light-sensitive surface of electrode 17 along successive lines of scanning.

The lens systems 18 and 37 in order to be simultaneously focussed upon the signal plate 54 and the film, are for instance arranged in a wall portion 38 which is slideable in the direction of double arrow 39 and light-tightly guided at 40 within a correspondingly shaped aperture in the front of casing 10. In order to permit such sliding movement, partition wall 36 is sub-divided so that its part 41 connected with wall portion 38, can move relative to the fixed portion 36. Known means for finely adjusting the lens system of a camera can be used for adjusting the position of wall portion 38 and are therefore not shown. Of course any other mechanical link may be used for simultaneously focussing the two lens syetems.

The television reception and reproducing apparatus at place II comprises a casing 67 in which a cathode-ray projection tube 68 is arranged. This tube is provided with an electron gun 78 inside and near the bottom of its neck 69, producing a focussed cathode-ray beam 70 which scans a fluorescent screen 71 attached on or near one front wall of tube 68; the layer of fluorescent material can also be carried or backed by a metal plate or layer of high optical reflecting power. The opposite front wall 74 of tube 68 is optically perfect, and through this wall the self-luminescent picture created on the fluorescent screen 71 is projected by lens system 75 in a magnified size upon picture screen 76. The scan of the cathode-ray beam over the fluorescent screen is effected by deflection coils, one coil 80 being shown only, and the intensity of the beam is controlled or modulated by a control electrode 78 upon which amplified picture signals from picture amplifier 35 are impressed.

The particular type of large screen television reproducer forms no subject matter of the invention; any suitable television projector or large screen picture projection can be used. Thus, for instance, a television projector based on supersonic light modulation and with mechanical scanning members, can be employed, the picture signals from amplifier 35 being used to modulate the supersonic waves in the supersonic light modulator. Furthermore, instead of a cathode-ray tube in which a self-luminescent fluorescent screen is used, a cathode-ray tube can be used comprising an image screen the optical properties of which, such as its opacity or reflecting power, or refractive index, are varied in their magnitudes by an impinging modulated cathode-ray beam, for instance a tube of the "Skiatron" type, as described in detail in U. S. Patent 2,330,171.

In the following it is assumed that the area or size of the exposed surface of electrode or signal plate 17 amounts to a multiple of the area or size of aperture 43 in film gate 42. It is further assumed that the focal lengths of lens systems 18 and 37 and their respective distances from the exposed surfaces of signal plate 17 and film 13 are identical; the areas of the images projected upon electrode 17 and film gate 42 are equal, but only the portion of the image which passes aperture 43 forms a "frame" on film 13.

Reference is now made to Fig. 2 which shows perspectively the exposed surface 54 of signal plate 17 on which a wide angle image is formed of scene 154 by lens system 18. By properly adjusting the amplitudes of the horizontal and vertical scan of the cathode-ray beam 19 on signal plate 54, a central portion 55 of the image formed on the surface of the signal plate can be scanned which corresponds to the portion of the scene imaged on the film 13 through aperture 43 of the film gate. Since both the aperture in the film gate and the signal plate are preferably centered to the optical axes of the lens systems 18, 37, the image portion on the signal plate corresponding to aperture 43 will be located centrally on plate 54, and the scanning deflections of beam 19 are to be arranged symmetrically to the horizontal and vertical center lines 135, 136 of the signal plate, requiring symmetric deflection voltages or currents for the deflecting means 21. By shifting this deflection either to the right or to the left or higher or lower, or both in a horizontal and vertical direction, it is possible to scan, and thereby explore, parts of the scene which lie partly or entirely outside of the field of view of the moving picture camera, and thus to judge how a scene will look eventually on the theatre screen if the direction of the camera is changed accordingly. These adjustments of the scanning are effected only in the pick-up cathode-ray tube 16, and do not affect the reproduction receiver, so that the size and position of the reproduced picture on picture screen 76 remain unaffected. Hence the effect of shifting the scan of signal plate with respect to the picture reproduced on screen 76 is the same as would be created by changing physically the direction of the camera, i. e. a different portion of the whole scene is shown on screen 76. For instance, instead of showing the central portion 55 of the whole scene imaged upon the signal plate, a portion 57 may be reproduced.

Referring to Fig. 4, the portion 60 again may correspond in size to the portion of the scene imaged on the film through aperture 43 of film gate 42. By changing the amplitudes of the horizontal and vertical scanning, for instance by diminishing these amplitudes without changing the centers of the sweeps, a smaller area 61 of screen 54 will now be scanned. Since again this change of scanning affects only the pick-up tube and not the reproduction apparatus, it will be realized that such a diminishing of the scanned surface of the signal plate 54 is equivalent to scanning a smaller part of the scene than before, whereas the size of the picture reproduced therefrom on screen 76 remains unchanged and results in a growing or blow-up of the reproduced scene, an effect which could be obtained otherwise by moving the camera closer to the scene. Vice versa, an increase in the scanning amplitudes on signal plate 54 will show as a reduction in size of each detail of the scene on picture screen 76. This will be similar in effect to a moving away of the camera from the scene.

If in the judgment of the observer, the picture reproduced on screen 76 of the portion of the scene passed through aperture 43 is satisfactory, he notifies the operator at place I that taking of the moving picture can be started or continued. If the portion of the scene appears unsatisfactory in one respect or the other, he explores the whole scene by either shifting the portion without changing its size and scale in the manner explained with reference to Fig. 2, or he reduces or increases the size of the section as explained with reference to Fig. 4, or he may combine both manners of exploring, and eventually notifies the operator at place I to change the position of the camera by turning it in a horizontal and/or vertical plane or to move the camera closer to or away from the object or scene.

In such manner a given scene can be quickly explored in every conceivable manner without physically changing the position of the moving picture camera and pick-up apparatus combined therewith. The observer will also discern on screen 76 whether the objects are properly lighted and in desirable position, and can advise the operator at place I to bring about any change in the scene, in the position of lighting apparatus, and of the position of the camera relative to the scene of acting or actual event about to be photographed.

In compliance with the directions of the observer, the operator has to change the position of the camera at place I and sometimes to adjust the lens systems 18, 37. After such change has been effected, the observer has to restore the electric adjustment of the pick-up camera to a position in which the area scanned on surface 54 is the same as passed through aperture 43 upon film 13. For example, if the observer has decided to have section 57 of the scene taken rather than section 55, and the operator has accordingly turned the camera in place I, the image of the scene on filmgate 42 and surface 54 is displaced and its portion now passing aperture 43 corresponds to the portion formerly comprised by area 55. Therefore the observer has to restore the electric adjustment of the pick-up camera to the initial state in order to reproduce on his viewing screen 76 the section actually being taken. If the operator is ordered to move the camera closer to the scene or to change the lens foci, again the pick-up camera scanning amplitude is to be readjusted so that beam 19 scans its larger section 60 which now corresponds to the portion imaged in aperture 43. If the operator has been ordered to move the camera farther away from the scene, the scan of the pick-up camera is to be readjusted so that beam 19 scans its smaller portion 61.

It is well known in television transmission and reproduction technique, that scanning of a given area is performed by moving a pencil-like cathode ray beam horizontally as well as vertically over that area. The horizontal motion is along lines, and the vertical motion causes the beam to start scanning the next following line vertically displaced by a small amount with reference to the preceding line; after all the lines of the area are thus scanned in succession, the beam is returned to the start of the first horizontal line. For this purpose two separate sets of electrostatic deflecting electrodes or electromagnetic deflecting coils are used, one set to deflect the beam horizontally and the other set to deflect it vertically.

Referring to the transmitter or pick-up side I in Fig. 1, there is shown an electromagnet coil 21 to effect one of the indicated deflections of beam 19, either in horizontal or vertical direction; it is assumed in the following that coil 21 effects the horizontal scan. In order to obtain a periodic linear deflection by means of an electromagnetic deflection coil, the current flowing through such deflection coil must be of a so-called saw-tooth wave form.

Referring to Fig. 3 a saw-tooth current wave diagram indicating current values in arbitrary units depending on time, is shown. The current increases gradually from an initial minimum to a maximum current and then drops to the initial value. While the current increases, beam 19 is moved or deflected from an initial position defined by the minimum current through coil 21 to an end position defined by the maximum current, and scans a horizontal line of the signal plate 17. With a given electric adjustment, these periodic current changes will cause the beam to sweep over a horizontal line e. g. from the left to the right within section 55. After scanning of the uppermost line has been completed and a synchronizing signal received, the current drops to the initial value and the beam almost instantaneously returns to the left side of section 55. During the horizontal scan another saw-tooth wave (not shown) energizes the other set of coils producing an electromagnetic field perpendicular to that of coil 21 which displaces the beam vertically downwardly so that the next horizontal sweep causes the second line of section 55 to be scanned, and so forth, until the scanning of the whole area 55 is completed. Thereupon the beam is swept back to the left upper corner of section 55 by the vertical and horizontal synchronising signals and a next cycle of scanning of that section starts. The manner in which such saw-tooth current wave through coil 21 can be produced is shown diagrammatically in Fig. 7.

The circuit producing the saw-tooth current waves in deflection coil 21 comprises a relaxation impulse generator, an amplifier, and various controlling means. The relaxation or impulse generator comprises a triode 114 containing an anode 115, a grid 116, and a cathode 117 (the cathode heating means and the grid-bias means are not shown).

A variable condenser 93 is connected in parallel with the anode and cathode, and is charged through a variable resistor 92 by a source of direct current 91. A positive voltage synchronizing impulse applied to grid 116 at terminals 90 causes the charged condenser 93 to be quickly discharged through tube 114, whereupon charging up of the condenser starts again. Thus the condenser voltage rises from a minimum to a maximum, and is suddenly reduced to the minimum at the moment when the synchronising impulse arrives, and a saw-tooth voltage wave similar to the current wave shown in Fig. 3 is thus produced across the condenser 93.

This voltage wave is amplified by an amplifier (or set of amplifiers) comprising another triode 96 provided with anode 99, cathode 97 and grid 98; the voltage wave is applied over condenser 95 to grid 98. Across the terminals of the secondary coil of the output transformer 106 a voltage wave is produced which essentially consists of sharp impulses similar but of a much higher amplitude than the synchronizing impulses applied to terminals 90. These voltage impulses are applied to deflection coil 21 over conductors 107, 108, and cause a current flow through that coil of the desired saw-tooth form required for properly scanning the signal plate in the manner described above.

The grid-bias voltage of the amplifier 96 can be changed by a potentiometer comprising a contact 104 sliding upon resistor 102 in series with source of direct current 101, a proper point 103 of which is connected with cathode 97. A change of the bias results in a change of amplification and therewith of the saw-tooth deflection current amplitude through coil 21, such as shown in Fig. 5 from curve 62 to curve 63, and therewith of the cathode ray beam scan across signal plate 54. This change and that for the vertical deflection effect a "size control" of the scanned picture. It is desirable to couple the horizontal and vertical size controls in such a way that a proportional change is effected in both directions. For instance, the sliding contacts of the two potentiometers for adjusting the respective bias may be connected with the same shaft or rod and actuated simultaneously. A second similar controlling potentiometer comprising a contact 113 sliding over a resistor 111 in series with source of current 110, a suitable point 112 of which is connected as shown in Fig. 7, superimposes over the saw-tooth deflection current through coil 21 a direct current of variable strength which effects an asymmetric shift of the deflection of the cathode ray beam across surface 54 of the signal plate by adding or subtracting constant current amounts to or from the instantaneous deflection current values, such as shown in Fig. 3, curves 58 and 59, and thus a "shift control" is obtained. Such shift controls are provided for horizontal and vertical shifts.

Both "size controls" and "shift controls" are situated at 82 at the observer's place II (Fig. 1).

Reverting to Fig. 1, the two impulse generators for causing horizontal and vertical deflections of beam 19 are indicated in the block diagram at 22 and their impulses translated through conductors 94 to a set of transmitter deflection amplifiers TDA of the type as shown in Fig. 7, and receiver deflection amplifiers RDA; the amplified impulses are translated through conductors 108 to the transmitter deflection coil 21 for horizontal line scanning and another coil (not shown) for vertical deflection (its energisation and control neither being shown). In order to bring about a shift of a portion of the picture from place 55 to place 57 (Fig. 2), the horizontal "shift control," Fig. 7, is arranged at 82 at the observer's stand and so are the other, vertical shift controls as well as the size controls. These controls affect only the transmitter deflection amplifier TDA but not the receiver deflection amplifiers RDA. All the observer has to do is to turn handle 81 to the right or left, whereby he changes in the manner described with reference to Fig. 7, the value of current through the horizontal and/or vertical deflection coils and thereby displaces the scanned areas on surface 54, without changing their size. Indicator 81 moves preferably over a dial which may be calibrated in angle degrees.

When the observer adjusts the horizontal and vertical shift controls 82 and finds eventually that portion 57 is the best to be taken of the scene, he can read on the dials of the controls the angle for which the moving picture camera has to be turned horizontally and vertically in order to get section 57 of the scene through aperture 43 of filmgate 42 upon film 13. He can telephone these readings to the operator at place I, who accordingly turns the camera about these angles.

Instead of telephoning from place II to place I, there can be included in the circuit over line 134, an electromagnetic remote control indicator 83 at place I, the finger 84 of which is moved over dial 85 about the same angle as indicator 81 is turned at place II, so that an optical instead of an acoustical indication at place I is accomplished and the order given to the operator.

Similarly in the case of the size control, the horizontal and vertical size control handles or a combined handle can move over a dial which is calibrated in units indicating a change of distance between the camera and object at taking place I, which would have caused a corresponding change in size or viewing angle. Instead, the calibration can be in distances between camera and scene. Such indication can be transmitted by remote control to place I, as has been explained above with reference to the shift controls. Thus, any operation of the size control handle, i. e. exploration of the field of view with regard to its desired degree of blow-up or viewing angle, will immediately indicate either on place II to the supervisor the required change of distance between camera and scene which he can communicate by telephone or otherwise to the camera man, or this distance will be shown directly by remote control to the camera man at place I.

Upon moving the camera and pick-up combined therewith according to the orders given, also the position of surface 54 of signal plate 17 relative to the scene is changed so that its portion 57 is covered by a different part of the scene than before the camera adjustment. The observer therefore has to restore the initial conditions between signal plate and film by restoring the shift controls at his stand, so that the central portion of surface 54 corresponding to the film picture is scanned again and reproduced on his viewing screen 76. The restoration of the scanning of the signal plate to its initial central position, i. e. the restoration of the shift- and size-controls to their initial positions and extends can also be effected semi-automatically, for instance by pressing a button or pushing a lever whereby all the control potentiometers are restored to their initial or zero positions. The restoration can also be effected fully automatically and derived from the adjusting movement of the camera or from focusing of the lens (in the case of size control). For instance, a potentiometer can be mechanically connected at place I with the horizontal camera adjustment handle and electrically connected with the horizontal shift control potentiometer 82 at the observer's position II in such a way that the movement of its contact at place I by the mechanical adjustment of the camera effects a current change through deflection coil 21 opposite to that caused by the horizontal shift control 82, and compensates the current change brought about by the observer at position II. Instead of an electric compensation, mechanical means can be employed, for instance, a flexible shaft actuated by the camera adjustment at place I may transmit this adjustment movement to place II and control 82, restoring the latter to its initial positions. Other known indicating and restoring means operating on the principles of remote control can be used for the purpose of the invention.

If electrostatic deflection electrodes are used instead of electromagnetic deflection coils, the effect of the voltage applied across the electrodes is the same as that of the deflection current as explained hereinbefore, and is illustrated in Fig. 3. There it is assumed that the voltage amplitude of the saw-tooth wave changes between 500 and 550 volts, curve 58, and effects a horizontal scanning of the area 55, Fig. 2, and that to shift this horizontal scan to area 57 a direct current voltage of 20 volts is to be superimposed on the saw-tooth voltage, changing the minimum and maximum voltage amplitude to 520 and 570 volts, respectively, curve 59. This superimposition of a direct current voltage can be effected in ways well known in the technique of radio circuits, e. g. by means of a suitable potentiometer. Similarly, the vertical scan can be shifted to any desired portion of the screen 54.

If, with such electrostatic deflection, a size control of the scanned picture area on signal plate 54 is to be effected, it is only necessary to vary the amplification factor of the deflection voltage amplifier TDA, Fig. 1, by size control means as shown in Fig. 7. Thus, with reference to Fig. 5, if the initial deflection voltage of the saw-tooth wave oscillates between 500 and 550 volts, curve 63, corresponding to a scanning deflection across area 61 of screen 54, Fig. 4, a symmetrical increase of the deflection voltage so that it varies from 490 to 560 volts, curve 62, will cover a scan of an area 60 on signal plate 54. A similar and proportional increase in scanning size has to be simultaneously effected in vertical direction, for instance, by arranging the contacts of the vertical and horizontal potentiometers on the same shaft.

Such an increase in scanning area (from 61 to 60) on the signal plate will have the effect of covering a wider picture angle or increasing the distance between the camera and the scene, and thus will show on picture screen 76 as a shrinking-in of all dimensions connected with an increase in viewing angle. Vice versa, a reduction of the scan voltage and therewith area from 60 to 61 on screen 54, will effect on picture screen 76 a "blow-up" of the picture equivalent to bringing closer the camera to the scene or to an increase in the focal length of lens system 37, and will tend to create conditions for a "close-up."

Similarly, as has been explained above with reference to the shift control, after the camera at place I has been adjusted for proper size by either changing the distance to the scene or the focal length of its lens, the scanning amplitude on signal plate 17 must be restored to its initial position, that is, scanning a picture area equivalent to the one imaged upon the film through aperture 43 of film gate 42. This restoration may be effected by re-adjusting the size control handle at place II to its zero position, for instance semi-automatically or by fully automatic remote control restoring means, as explained hereinbefore with reference to the shift control. The restoration of both shift control and size control to their initial or normal positions where the signal plate area 54 is scanned in its central position and with an amplitude corresponding to the picture imaged upon film 13 through aperture 43, may be effected simultaneously.

As has been mentioned above, the horizontal and vertical changes of the size of the scan of a portion of signal plate area 54, should be in proportion to each other; if for instance, the horizontal scan is increased by 20%, the vertical scan should equally be increased by 20%. Thus it is preferable to arrange the potentiometers for the horizontal and vertical size controls on one shaft and to operate them simultaneously at the same ratio.

As to the horizontal and vertical shift controls which are independent of one another, these too can be coupled with a common actuator, for instance, in such a manner that they are controlled by one handle which is moveable in a horizontal and/or vertical direction by means of a ball-joint mounting. A horizontal movement of the handle will operate only the horizontal shift potentiometer, and a vertical movement only the vertical shift potentiometer. A movement of this handle in a direction containing both horizontal and vertical components will then effect a change in the adjustments of both the horizontal and the vertical potentiometers in proportion to these components of direction, resulting in a shift of the scanned area in the very direction of movement of the control handle.

Finally, both shift and size controls may be effected by operating one handle. The just described shift control handle may also operate the size control, in that e. g. a turn of the handle in a clockwise direction effects a blow-up of the picture on screen 76, whereas a turn in counter-clockwise direction effects an increase in its viewing angle. Instead of rotating the handle, it can be pulled out or pushed in its mounting for effecting a change in size.

Thus the supervisor at place II can operate a "universal" handle of the type described, and attached e. g. to his observation seat, and thereby very quickly explore the picture on screen 76, with regard to angle of view, close-up characteristics, and portion of scene to be taken.

In special cases the horizontal and vertical scans may not be changed proportionately in the manner explained above, in order to obtain certain trick effects, e. g. an abnormal extension or contraction of the vertical with respect to the horizontal dimensions as obtained otherwise for instance by distorting mirrors. After such effects have been examined by the supervisor by independent changes of the vertical or horizontal controls, a suitable optical change, for instance by the use of cylindrical mirrors or cylindrical lenses, can be made in the optical system of the moving picture camera and thereby the same picture distortion accomplished on the film as the one viewed on screen 76.

In the foregoing it has been mentioned that the fly-back of the cathode ray beam after completion of a line and frame scan, i. e. scan of an area, is caused by synchronizing impulses impressed on terminals 90, Fig. 7. They can be derived for instance, from alternating current mains of a given frequency to which is thus locked the frequency of total scanning of a given area or portion. In cases where the synchronization cannot be derived from suitable A. C. mains, such as in the open field, the synchronizing impulse can be derived from a mechanical contactor suitably geared with any of the rotating parts of the moving picture camera. Thus, by way of example, a contact ring 46, Fig. 1, of insulating material interrupted by conducting parts 49, is mounted on the electrically conductive shaft 45 of the shutter 44. Through housing 10, or another contact 48 sliding on the shutter shaft, the conducting parts 49 are connected with one of the synchronizing terminals 90 over a source of D. C. voltage which supplies a positive grid-bias whenever contact 50 runs over conductive part 49 and connects through line 51 the positive end of the D. C. source with grid 116 of tube 114, and thus causes the sudden discharge of condenser 93, as above explained, resulting in the fly-back of the scanning beam. By varying the number of contacts 49 over the circumference of ring 46 or by suitably gearing the mechanical contact device with the camera movement, any desired rate between frame scannings and pictures taken per second can be obtained. The line synchronizing impulses can be derived from these frame synchronizing impulses by frequency multiplication means well known in the art of television. Any other way of deriving the synchronizing impulses can be employed; thus, for instance, they may be produced by light impulses derived from shutter 44, or another light chopper, and a photo-electric cell.

For completeness' sake there is also shown diagrammatically in Fig. 1 the manner in which beam 70 is caused to scan the fluorescent screen 71 and how its intensity is controlled. The horizontal and vertical scanning motions of beam 70 are conveniently caused by the same two saw-tooth wave generators arranged in 22, Fig. 1, as used for producing the scanning motions of beam 19. Thus, for instance, from the saw-tooth wave or "deflection generator" for the line scan, Fig. 7, the saw-tooth wave voltage produced and translated through lines 94 is branched off through line 131, Fig. 1, to the receiver deflection amplifier set RDA, which is adjusted once and for all so that the amplified saw-tooth wave voltage translated through line 132 to coil 80 for deflection of beam 70 remains constant and is independent of the various adjustments by the size and shift controls in the transmitter deflection amplifier TDA and lines 108, 109, Fig. 7, as described hereinbefore. Thus the length of the scan by beam 70 of the fluorescent screen 71 will be constant. This holds both for the horizontal and vertical directions. As a consequence, the fluorescent image produced on the fluorescent screen 71 by beam 70 will always have the same size and position, and the same holds true for its magnified picture projected upon the viewing screen 76. Synchronization between the scanning motions of the beam 19 and 70 is automatically obtained by the injection of the synchronizing impulses in the manner described hereinbefore into the saw-tooth wave generators for the horizontal and vertical scanning motions because these generators are common to the sweep controls of both beams 19 and 70.

Though well known in the art of television, the transmission of a picture from place I to place II should be briefly described:

The image of the scene 154 produced by lens 18 on signal plate 17 of pick-up tube 16 is scanned by cathode-ray beam 19 of this tube. Thereby, in a well-known manner, picture signals are created in the form of voltage variations at this signal plate and impressed through line 23 across capacitor 27 upon grid 28 of an initial amplifier stage 29, and from there through line 34 to picture amplifier 35. Through suitable impedances 24 and 33, the proper D. C. voltages from sources not shown are impressed upon the signal plate and between anode 30 and cathode 31 of tube 29. The amplified signals are translated from amplifier 35 through line 77 to the reception cathode-ray tube 74 and impressed upon its modulator electrode 78, whereby the intensity of cathode-ray beam 70 which scans the fluorescent screen 71 is modulated. Thus a luminous picture reproduction of scene 154 is produced on screen 71 and is projected in magnified size through lens system 75 upon picture screen 76; the large size picture of the scene 154 thus produced on screen 76 is representative of the impression which the picture finally projected from the film onto a theatre screen will create.

The link carrying the picture signals from place I to place II will be preferably a co-axial cable which can include the various conductors required for synchronising and control purposes, such as 108, 10, 132, 133, and 134. The picture signals can also be transmitted by wireless, in a way well known in television.

There can be provided, of course, several observation stands II in which during the process of taking the picture it can be explored and controlled either on large screens 76, in an executive's room or even in a picture theatre, or on a small monitor screen, for instance of a direct view cathode-ray tube producing only a small picture for monitoring purposes. Thus control pictures may be observed simultaneously by various executives such as the director, head cameraman and others.

The optical axes 52 and 53 of the lens systems 18 and 37 are parallel, and thus strictly identical pictures are formed by these systems on the signal plate and film, respectively, only of scenes which are rather far away from the camera. For nearby scenes identical picture parts will be displaced on the film and signal plate with respect to these optical axes. This well known parallax can be compensated by a proper inclination of the optical axes. This compensation can be effected mechanically by changing the distance between lenses 18 and 37 by an amount depending upon the distance of the object 154, that is, upon the focusing of these lenses, and it is well known from the technique of photographic cameras to couple the focusing movement and parallax compensation with each other.

The above explained possibility of shifting the scanned area on signal plate 17 by simple electrical control, provides, however, a means for compensating the parallax in a purely electrical manner. To this end it is only necessary to effect a vertical shift of the scanned area depending upon the focusing of the lens system 18 and/or 37.

Fig. 8 shows such an arrangement. Lens system 12, (corresponding to lens system 18) is mounted there in frame 130 which is slideable in aperture 120 of casing 10 and connected with rack 121 meshing with pinion 122 on the shaft of which lever 123 is mounted. Lever 123 is movable over potentiometer 124 connected in series with a source of direct current 125. With point 126 of source 125, a terminal 128 is connected; another terminal 127 is conductively connected with the shaft of wheel 122. Terminals 127, 128 are included in the vertical shift control circuit, Fig. 7, and can be arranged in series with the vertical "shift control" 82 operated by the observer, for instance inserted in the circuit at point 118. Resistor 124 is dimensioned so that upon moving lens system 129 (18) away from signal plate 17 upon bringing the camera closer to the scene, an energisation of the vertical deflection coil or electrode is caused which shifts the scanned section downwardly on signal plate 17 by the same amount as the central picture point is displaced from the optical axis or center of plate 17. Thereby the picture on screen 76 will always correspond exactly to the portion of scene 154 actually imaged on the film through filmgate 42. This exact adjustment of the vertical shift and parallax compensation can be effected by grading the potentiometer resistor 124, or by coupling the movement of the sliding contact 123 with lens system 129; this coupling can be non-linear, for instance, by giving rack 121 and pinion 122 an empirical shape.

In Fig. 6 a modification of the invention is illustrated in that a single lens system 37 is used for projecting a picture both upon film 13 and the exposed surface of signal plate 17 so that no parallax can occur at any time. To this effect, the shutter is arranged at an angle of 45° with the optical axis 53 of lens system 37 and its blade or blades are provided on their side facing lens system 37 with a mirror 87. The distance of film 13 from the point where optical axis 53 strikes mirror surface 87 equals the distance of that point (along reflection axis 88) from the surface of signal plate 17. Shutter 44 exposes during its rotation in one position aperture 43 to lens system 37 and covers in another position that aperture (while film 13 is transported) so that mirror 87 is in the path of the light rays through lens system 37 and projects them upon the exposed surface of signal 17. The operation of this modification of the invention is otherwise the same as described previously with reference to Fig. 1.

From the above it will be appreciated that the observer at his stand II can explore a scene before a picture is taken and examine without consuming film the effects of a setting including field of view, scale, and sharp focus, and supervise thereafter the taking of a moving picture in the same and other aspects without causing noise or disturbing the actors. If he uses remote control for changing the direction or position of the camera on a carriage or for moving the latter, as well as for adjusting the lens systems 18, 37, he can even cause the taking of moving pictures without any operator being present, such as in dangerous situations. The exploration and selection is made by the observer by operating four, two (combined) or even one "universal" control. The restoration of the section scanned in the pick-up tube after the camera has been brought into a new position or focus, can be semi-automatically effected by the observer by operating the restoring button or lever or even fully automatically through the movement of the camera itself as above explained; also servomotors can be employed. The effect of a parallax can be compensated by electrically and automatically shifting the section scanned in the pick-up tube or eliminated by the use of a single lens system for both taking the moving picture and controlling the pick-up tube. Synchronising impulses can be derived from A. C. mains, if available, or from a moving element of the camera such as its shutter, and in the latter instance the motion of the film can be synchronized with the frame period of television pictures. The ratio of the number of film frames photographed per second and fields televised can be chosen, such as 24 film frames per second and 24 or 48 television fields per second. In the television devices either straight or interlaced scanning may be employed.

It is within the scope of the invention to form on the exposed surface 54 of signal plate 17 of the pick-up tube of the television transmitter, an image of the field before the camera as large as the field of view of the picture camera, and to explore this field by scanning various smaller areas of the image enabling the supervisor to judge the possible approach of the camera to the scene at which the moving picture is to be taken and to cut out unessential marginal portions from the scene or field in front of the moving picture camera, whatever he sees fit.

It should be further understood that the two lens systems 18 and 37 forming images of scene 154 on the signal plate and film, respectively, may have different focal lengths, so that the images would be of a different scale. This does not involve any principal change of the function of the invention compared with the normal case where the optical systems have equal focal lengths. It only requires that the scanning amplitudes in the zero position are such that on the signal plate 17 an area is scanned which contains the same picture information as is admitted through aperture 42 in film gate 43 to the film, even though the sizes of these corresponding impressions may be at variance with each other.

It should further be pointed out that the observer at place II, by operating his control handle or handles can effect a visible exploration of the picture on the picture screen 76, and simultaneously any desired adjustment of the camera with respect to the scene. In this case, a universal control handle can directly effect a physical movement of the camera both in distance and angle with respect to the scene, and no change of scan either in amplitude or position would be necessary. In general, however, the exploration will take place first as described above by controlling the scan of the signal plate 17, and subsequently and independently the camera angle and distance will be adjusted, for instance by remote control.

It should be further understood that the invention is not limited to any exemplification hereinbefore described or shown but is to be derived in its broadest aspects from the appended claims.

What I claim is:

1. A system for controlling and supervising from a distant place the taking of pictures by a moving picture camera combined with a television pick-up apparatus for an image of the field before the moving picture camera which is transmitted to a television receiver at a distant place, essentially comprising, in combination, a moving picture camera and television pick-up apparatus associated therewith, optical means for forming an image of the field before said moving picture camera in said pick-up apparatus, the field so imaged being at least as large as and including the field of view of said moving picture camera, electric means for scanning said image, electrical controlling means for varying the size or position of scanned areas of said image, and a television receiver at the distant place for reproducing such a scanned area.

2. A system for controlling and supervising from a distant place the taking of pictures by a moving picture camera combined with a television pick-up apparatus for an image of the field before the moving picture camera which is transmitted to a television receiver at a distant place, essentially comprising, in combination, a moving picture camera and television pick-up apparatus associated therewith, optical means for forming an image of the field before said moving picture camera in said pick-up apparatus, the field so imaged being at least as large as and including the field of view of said moving picture camera, electric means for scanning said image, electric means for controlling from the distant place said scanning means so as to scan selected areas of various sizes or positions of said image, a television receiver at the distant place for reproducing such a scanned area on a viewing screen, and electrical means for maintaining the size and position of the image on said viewing screen substantially the same independent of the size and position of the scanned area in the pick-up apparatus.

3. A system for controlling and supervising from a distant place the taking of pictures by a moving picture camera combined with a television pick-up apparatus for an image of the field before the moving picture camera which is transmitted to a television receiver at a distant place, essentially comprising, in combination, a moving picture camera and television pick-up apparatus associated therewith, optical means for forming an image of the field before said moving picture camera in said pick-up apparatus, electric means for scanning areas of various sizes or positions of said image, a television receiver at the distant place including an image screen, electric means for scanning a predetermined area of said image screen in synchronism with the scanning of said areas in the pick-up apparatus, and electrical means for impressing signal impulses generated in said pick-up apparatus upon the modulating means in said receiver.

4. A system for controlling and supervising from a distant place the taking of pictures by a moving picture camera combined with a television pick-up apparatus for an image of the field before the moving picture camera which is transmitted to a television receiver at a distant place, essentially comprising, in combination, a moving picture camera and television pick-up apparatus associated therewith, optical means for forming an image of the field before said moving picture camera in said pick-up apparatus, the field so imaged being considerably larger than and including the field of view of said moving picture camera, a television receiver at the distant place including an image screen, electric means for scanning said image in said pick-up camera, electric means for scanning said image screen in said receiver, electric means as exemplified by saw-tooth wave generators for horizontal and vertical scanning for producing recurrent electric impulses for causing and controlling the scanning motions of the scanning means in said pick-up apparatus and receiver, adjustable electrical means for impressing said impulses upon and controlling the scanning means in said pick-up apparatus so that scanning of areas of various sizes or positions of said image can be adjusted, electrical means for impressing said impulses upon said scanning means in the receiver so that a predetermined area of said image screen is scanned, and electrical means for impressing picture signal impulses generated in said pick-up apparatus upon the modulating means in said receiver.

5. In a system as set forth in claim 4, remote control means for adjusting from the distant place said adjustable impressing means.

6. A system for controlling and supervising from a distant place the taking of pictures by a moving picture camera combined with a television pick-up apparatus for an image of the field before the moving picture camera which is transmitted to a television receiver at a distant place, essentially comprising, in combination, a moving picture camera and television pick-up apparatus associated therewith, adjustable optical means for forming an image of the field before said moving picture camera in the latter, adjustable optical means for forming an image of the field before said moving picture camera in said pick-up apparatus, the field so imaged being considerably larger than and including the field imaged in the moving picture camera, means for adjusting both said optical means in unison, controlled electric means for scanning areas of various sizes or positions of the image in said pick-up apparatus, additional electrical means for adjusting the areas scanned of the image in said pick-up apparatus dependent on the adjustment of said optical means so as to avoid parallax effects, and a television receiver at the distant place for reproducing such a scanned area.

7. A system for controlling and supervising from a distant place the taking of pictures by a moving picture camera combined with a television pick-up apparatus for an image of the field before the moving picture camera which is transmitted to a television receiver at a distant place, essentially comprising, in combination, a moving picture camera and television transmitter pick-up apparatus associated therewith, adjustable optical means for forming an image of part of the field before said moving picture camera on the film of the latter and optical means for forming an image of said field on the light sensitive surface of said pick-up apparatus, means for adjusting said optical means in unison, electric means for scanning areas of various sizes or positions of said image formed in said pick-up apparatus, and a television receiver at the distant place for reproducing such a scanned area.

8. A system for controlling and supervising from a distant place the taking of pictures by a moving picture camera combined with a television pick-up apparatus for an image of the field before the moving picture camera which is transmitted to a television receiver at a distant place, essentially comprising, in combination, a moving picture camera and television transmitter pick-up apparatus associated therewith, optical means for forming an image of part of the field before said moving picture camera on a moving picture film in the latter, movable reflecting means in the path of light from said optical means so as to reflect said light into said pick-up apparatus, means for intermittently moving said light-reflecting means so that alternately the field before the moving picture camera is imaged in the latter and in said pick-up apparatus, electric means for scanning various areas of the image formed by reflection in said pick-up apparatus, and a television receiver at the distant place for reproducing such a scanned area.

9. In a system as set forth in claim 8, said movable light reflecting means comprising a mirror associated with the movable shutter in the path of light from said optical means, said mirror arranged at an angle with said path of light so as to reflect the light into said pick-up apparatus when said mirror is in said path.

10. In a unit essentially comprised of a moving picture camera and television pick-up apparatus, in combination, optical means for forming an image of part of the field before the moving picture camera on a light-sensitive film in the latter, optical means for forming an image of said field on the light-sensitive surface of the pick-up apparatus, electric means for scanning said image formed on said surface, and electrical controlling means for operatively adjusting various scanning motions of said scanning means so that areas of various sizes or positions of said light-sensitive surface and field imaged thereon can be scanned.

11. A system for controlling and supervising from a distant place the taking of pictures by a moving picture camera apparatus combined with a television pick-up apparatus for an image of the field before the moving picture camera apparatus which is transmitted to a television receiver at a distant place, essentially comprising, in combination, a moving picture camera apparatus and television transmitter pick-up apparatus associated therewith, optical means for forming an image of part of the field before said moving picture camera apparatus on a light sensitive surface in one of said apparatuses, movable reflecting means in the path of light from said optical means to reflect said light into the other of said apparatuses, means for intermittently moving said light reflecting means so that alternately the field before the moving picture camera apparatus is imaged in both of said apparatuses, electrical means for scanning various areas of the image formed in the television apparatus, and a television receiver at the distant place for reproducing such a canned area.

ADOLPH H. ROSENTHAL.

REFERENCES CITED

The following references are of record in the file of this patent:

UNITED STATES PATENTS

| Number | Name | Date |
| --- | --- | --- |
| 2,162,908 | Bedford et al. | June 20, 1939 |
| 2,347,933 | Campbell | May 2, 1944 |
| 2,312,954 | Bown | Mar. 2, 1943 |
| 2,384,232 | Beers | Sept. 4, 1945 |

FOREIGN PATENTS

| Number | Country | Date |
| --- | --- | --- |
| 504,750 | British | May 1, 1939 |

Certificate of Correction

Patent No. 2,420,197.                    May 6, 1947.

ADOLPH H. ROSENTHAL

It is hereby certified that errors appear in the printed specification of the above numbered patent requiring correction as follows: Column 3, line 45, for "syetems" read *systems*; column 12, line 18, for the numeral "10" read *109*; line 57, for the reference numeral "12" read *129*; column 18, line 9, claim 11, for "canned" read *scanned*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*